Feb. 22, 1955 O. GISVOLD 2,702,808
OXIDATION PROCESS
Filed Dec. 2, 1950
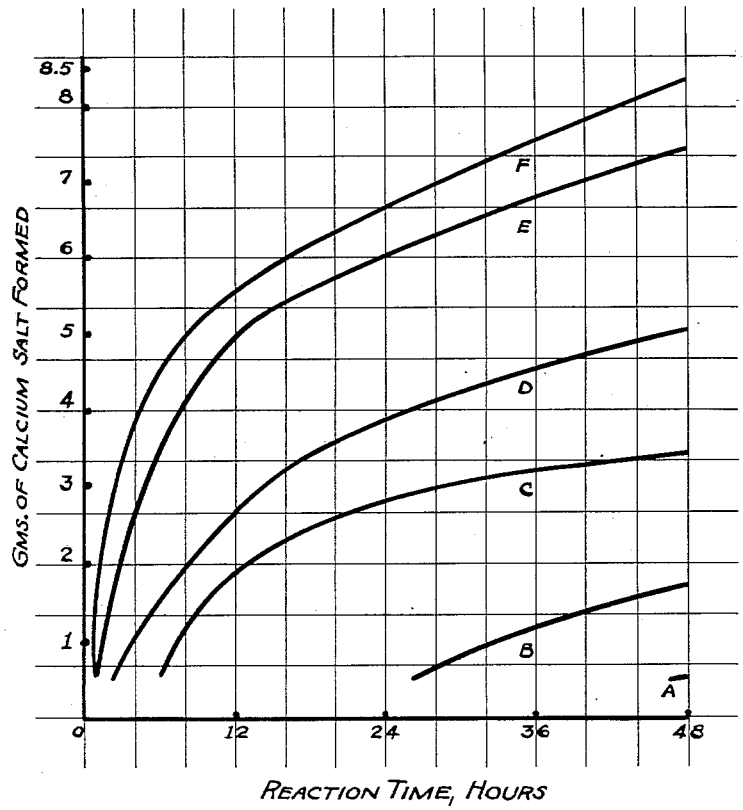
MOLAR RATIO OF NITROGEN
DIOXIDE TO SORBOSE:
- A. 4 TO 1
- B. 5 TO 1
- C. 6 TO 1
- D. 7 TO 1
- E. 8 TO 1
- F. 10 TO 1
INVENTOR.
OLE GISVOLD
BY Paul, Paul & Moore
ATTORNEYS

United States Patent Office 2,702,808
Patented Feb. 22, 1955

2,702,808

OXIDATION PROCESS

Ole Gisvold, St. Paul, Minn., assignor to Regents of the University of Minnesota, Minneapolis, Minn., a corporation Application December 2, 1950, Serial No. 198,863

11 Claims. (Cl. 260—343.7)

The present invention relates to a process of oxidizing primary hydroxyl groups in carbohydrates and carbohydrate-like compounds and is particularly directed to the oxidation of such compounds for the purpose of producing reducing compounds. The invention also involves more specifically a novel process of producing ascorbic acid, vitamin C.

It is therefore an object of the present invention to provide a novel process of oxidizing primary hydroxyl groups in carbohydrates and carbohydrate-like compounds.

It is another object of the present invention to provide a novel process of oxidizing carbohydrates and carbohydrate-like compounds for the production of compounds having reducing properties.

It is a further object of the present invention to provide a novel process for producing ascorbic acid.

The oxidation process involves the contacting of the carbohydrate material with nitrogen tetroxide, $N_2O_4$, under anhydrous conditions. It is essential that the reaction mixture be strictly anhydrous and in order to insure the continuance of anhydrous conditions, it is essential that a neutral, inert, stable and exceedingly effective drying agent be included in the reaction mixture. Under these conditions it is found that primary hydroxyl groups of carbohydrate materials may very readily be oxidized to the carboxylic acid group in very high yields and without the formation of substantial quantities of side reaction products, such as oxalic acid, which ordinarily accompanies many oxidations of this type of material.

The reaction is applicable to carbohydrates and carbohydrate-like materials in general. Typical of the materials which may be oxidized by the present process are sorbose, fructose and sucrose. The conversion of l-sorbose to l-ascorbic acid may be performed in accordance with the following series of reactions:

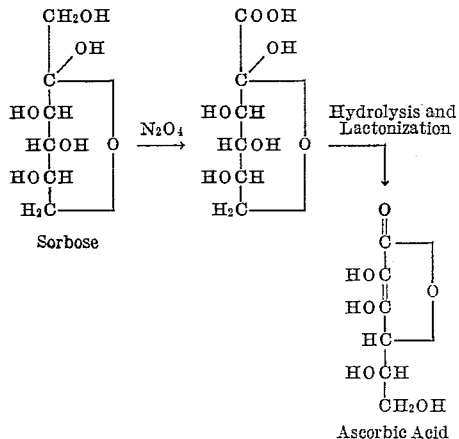

Ascorbic Acid

It will be apparent from this reaction that it is essential that the pyranose ring structure of sorbose be maintained intact during the oxidation to prevent the oxidation of both the primary hydroxyl groups which are present in the straight chain form of sorbose. It has been found that strictly anhydrous conditions are essential for this purpose. In order to maintain the strictly anhydrous reaction conditions, I have found that powerful dehydrating agents of a neutral and inert character, such as anhydrous calcium sulphate, which is commercially available under the name Drierite, are particularly effective. This dehydrating agent reacts practically instantaneously with the water liberated in the reaction and takes up the water and prevents the hydrolysis of the pyranose ring structure in the sorbose. In this manner it is possible to oxidize the single available primary hydroxyl group of sorbose while at the same time forming practically none of the dicarboxylic acid which would result from the oxidation of both the available primary hydroxyl group and the potential primary hydroxyl group which is part of the pyranose ring structure in sorbose. Likewise, the use of the anhydrous conditions prevents the formation of any substantial quantities of oxalic acid or other side reaction products. Other dehydrating agents such as silica gel and plaster of Paris may also be used.

In place of sorbose other derivatives of sorbose may likewise be employed in this reaction. For example, the methyl glycoside of sorbose can be used. The reaction is also applicable to the diacetone derivative of sorbose which may readily be formed by reaction with anhydrous acetone in the presence of a small quantity of copper sulphate or sulfuric acid.

The oxidation of d-fructose proceeds in the same manner as that illustrated above with respect to sorbose. The reaction may be carried out under the same conditions and the results which are obtained are the same except for the fact that fructose has a different configuration from sorbose and accordingly the ene-diol compound obtained by hydrolysis and lactonization of the oxidation product does not have the physiological properties of vitamin C. The ene-diol compound, however, is a very powerful reducing agent and is useful as such.

The conversion of sucrose to an ene-diol compound proceeds according to the following series of reactions:

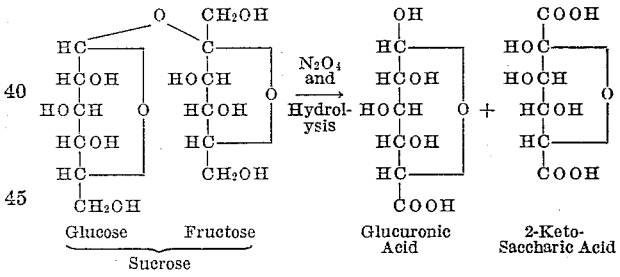

Ene-diol of 2-Keto Saccharic Acid Lactone

Since the fructose unit in sucrose contains a furanose structure instead of a pyranose structure, it is apparent that the oxidation product is a dicarboxylic acid instead of a monocarboxylic acid as is the case when fructose itself is employed as the starting material. Since, however, the oxidation product of fructose itself has no physiological vitamin activity, it will be apparent that for the production of reducing substances it is immaterial whether the oxidation product contains a primary alcohol group and a carboxylic acid or whether it contains two carboxylic acid groups. The essential part of the compound is the ene-diol group which contributes reducing properties to the oxidation product of fructose itself, as well as the oxidation product of the fructose unit in sucrose.

The following examples will serve to illustrate the invention.

Example I

Sorbose (9 grams, 1/20 mol) anhydrous calcium sulphate (29 grams) and dry filter cell (9 grams) are finely powdered in a stone mill and then placed in a 250 cc. Erlenmeyer flask to which is added 23.4 grams of nitrogen tetroxide dissolved in 50 cc. of carbon tetrachloride. The mixture is then allowed to stand for 48 hours accompanied with occasional shaking. The excess nitrogen oxides and carbon tetrachloride are then removed from the reaction mixture by means of a suction funnel and dried air is then passed through the mixture until it appears dry and white. The mixture is then extracted with 200 cc. of methanol and to the clear alcoholic solution there is added 50 cc. of distilled water. The alcohol can then be removed in a vacuum at a low temperature and the remaining solution concentrated to about 40 cc. To this solution calcium carbonate is added until no more carbon dioxide is evolved. The excess calcium carbonate is then filtered off and washed with enough distilled water to make up the volume of the clear filtrate to 50 cc. 200 cc. of methyl alcohol are then added to this aqueous filtrate in order to precipitate the calcium salts of 2-ketogulonic acid and possibly other sugar acids that have been obtained. This precipitate is washed with 50 cc. of methyl alcohol and subsequently dried. Average yield of the calcium salts of the sugar acids is about 8.3 grams.

The sugar acids (chiefly 2-ketogulonic acid) are then liberated from the calcium salts by using stoichiometric amounts of oxalic acid or sulfuric acid. The resulting amorphous mixture of sugar acids can then be lactonized by treatment with acid to yield some pure ascorbic acid which can be identified by comparison with known samples.

Before the addition of calcium carbonate it is advantageous to treat the hydroalcoholic solution with hydrogen sulfide. Hydrogen sulfide decomposes any residual oxides of nitrogen so that they cannot further act as oxidizing agents to lower the yield of desired products.

The preparation of ascorbic acid from the calcium salt of 2-ketogulonic acid may be carried out as follows:

20 grams of calcium salt are dissolved in 50 grams of water and to this solution is added approximately 5.916 grams of oxalic acid dissolved in approximately 68 grams of water. Calcium oxalate precipitates leaving the free 2-ketogulonic acid solution. After the reaction mixture is allowed to stand for a couple of hours in a cool place the calcium oxalate is filtered off. The filtrate containing the free 2-ketogulonic acid is then heated on a water bath under a constant stream of carbon dioxide for two hours. Thereafter, the reaction mixture containing ascorbic acid is concentrated to a thick syrup in a vacuum and mixed with acetone. The acetone solution is then filtered and the filtrate concentrated in vacuum to a syrup which upon standing in a refrigerator yields small needle shaped crystals of ascorbic acid. A few cubic centimeters of ice cold acetone are then added to the syrup to dilute it and the syrup is then filtered through a chilled glass suction filter. The ascorbic acid crystals are then washed with a small amount of ice cold acetone and subsequently recrystallized twice from methanol. The resulting compound melts at 188 to 190° C. and when mixed with an authentic sample of ascorbic acid shows no change in melting point. The analytical values for the ascorbic acid produced according to this example are as follows:

|  | Carbon | Hydrogen |
| --- | --- | --- |
|  | Percent | Percent |
| Calculated for $C_6H_8O_6$ | 40.91 | 4.58 |
| Found | 41.20 | 4.99 |

In this reaction the chemically inert anhydrous calcium sulphate absorbs water immediately upon its release during the chemical reactions involved. This is necessary in order to keep the sorbose in the pyranose ring structure. The calcium sulphate also serves a second purpose of preventing the formation of a syrupy mass which would markedly prevent the contact of the reactants. The dry filter cell also facilitates further dispersion of the sorbose.

Example II

Fructose (9 grams, 1/20 mol), anhydrous calcium sulfate (29 grams) and dry filter cell (9 grams) are finely powdered in a stone mill and then placed in a 250 cc. Erlenmeyer flask to which is added 23.4 grams of nitrogen tetroxide dissolved in 50 cc. of carbon tetrachloride. The mixture is then allowed to stand for 48 hours accompanied with occasional shaking. The excess nitrogen oxides and carbon tetrachloride are then removed from the reaction mixture by means of a suction funnel and dried air is then passed through the mixture until it appears dry and white. The mixture is then extracted with 200 cc. of methanol and to the clear alcoholic solution there is added 50 cc. of distilled water. The alcohol can then be removed in a vacuum at a low temperature and the remaining solution concentrated to about 40 cc. To this solution calcium carbonate is added until no more carbon dioxide is evolved. The excess calcium carbonate is then filtered off and washed with enough distilled water to make up the volume of the clear filtrate to 50 cc. 200 cc. of methyl alcohol are then added to this aqueous filtrate in order to precipitate the calcium salts of the 2-keto saccharic acid and possibly other sugar acids that have been obtained. This precipitate is washed with 50 cc. of methyl alcohol and subsequently dried.

Example III

Dried sucrose (10 grams), anhydrous calcium sulfate (80 grams) and filter cell (10 grams) are pulverized and mixed. The mixture is then oxidized with a mixture of 50 grams of nitrogen tetroxide in 100 cc. of carbon tetrachloride. After reacting for 48 hours the carbon tetrachloride and the excess oxides of nitrogen are removed in the same manner as described in Example I. The mixture is then extracted with methyl alcohol and the methyl alcoholic solution is concentrated in vacuum to about 50 cc. To this concentrate there is added about 200 cc. of ether and the resulting precipitate is filtered off with suction and dried in a vacuum dessicator. The resulting compound is acidic and shows strong dye reducing properties after being heated with strong acids.

Example IV

The methyl glycoside of sorbose is prepared as follows: 50 grams of sorbose are dissolved in 1500 grams of methyl alcohol containing 0.5% gaseous hydrochloric acid. The solution is then allowed to stand at room temperature (20° C.) for 24 hours. After neutralization with silver carbonate the methyl alcohol is distilled off under vacuum. The remaining syrup is then rubbed with acetone and the acetone solution filtered. The acetone is then distilled off under a water bath until turbidity appears. The remaining solution is then set aside for crystallization. The crystals after drying at 70° C. for three hours and after cooling in a vacuum dessicator over calcium chloride melt at 118° C.

9.0 grams of this dry methyl glycoside are pulverized with 27 grams of anhydrous calcium sulfate and 9 grams of filter cell. A mixture of 23 grams of nitrogen tetroxide and 50 cc. of carbon tetrachloride is then added and the reaction allowed to proceed for a period of 48 hours. The reaction mixture is then worked up as described in Example I to yield 8.2 grams of the dry calcium salt. The sugar acid liberated from the calcium salt demonstrates reducing properties.

It is apparent from the above examples that the present invention provides a simple and convenient method for oxidizing carbohydrates and carbohydrate-like materials for the production of reducing substances. It likewise provides a simple and economical process for the production of ascorbic acid.

It will be apparent that considerable variation in the reaction conditions may be employed. This is evident from the drawing which shows the variation in yield of the calcium salt obtained by the oxidation of sorbose under the various time periods of oxidation and various smaller ratios of nitrogen tetroxide to sorbose. It will be apparent from this figure that at low molar ratios of nitrogen tetroxide to sorbose the time period required for any reasonable degree of oxidation is extended somewhat. At higher ratios of nitrogen tetroxide, for example 8 to 10 mols of nitrogen tetroxide per mol of sorbose, the initial rate of reaction is extremely rapid. After about a period of 12 hours the reaction rate reduces somewhat but still proceeds at quite a substantial rate. It will be apparent that for best yield molar ratios of nitrogen tetroxide of 8 to 10 per mol of sorbose are recommended and time periods of from 24 to 48 hours.

While various modifications of the invention have been described, it will be apparent that other modifications are possible without departing from the spirit thereof.

What I claim is:

1. The process of selectively oxidizing a sugar containing a primary hydroxyl group on the No. 1 carbon atom and a lactal ring structure without hydrolysis of said lactal ring structure which comprises contacting said sugar with nitrogen tetroxide in the presence of a neutral inert strong dehydrating agent, whereby only primary hydroxyl groups are oxidized to carboxyl groups while maintaining the lactal ring structure intact.

2. The process of selectively oxidizing a sugar containing a primary hydroxyl group on the No. 1 carbon atom and a lactal ring structure without hydrolysis of said lactal ring structure which comprises contacting said sugar with nitrogen tetroxide in the presence of anhydrous calcium sulfate, whereby only primary hydroxyl groups are oxidized to carboxyl groups while maintaining the lactal ring structure intact.

3. The process of selectively oxidizing a sugar containing a primary hydroxyl group on the No. 1 carbon atom, a lactal ring structure and a group which is part of said lactal ring structure which is normally hydrolyzable to a hydroxyl group and is hence a potential primary hydroxyl group, said oxidation taking place without hydrolysis of the lactal ring structure and without oxidation of said potential primary hydroxyl group, which method comprises contacting said sugar with nitrogen tetroxide in the presence of a neutral inert strong dehydrating agent, whereby only primary hydroxyl groups are oxidized to carboxyl groups while maintaining the lactal ring structure intact.

4. The process of selectively oxidizing a sugar containing a primary hydroxyl group on the No. 1 carbon atom, a lactal ring structure and a group which is part of said lactal ring structure which is normally hydrolyzable to a hydroxyl group and is hence a potential primary hydroxyl group, said oxidation taking place without hydrolysis of the lactal ring structure and without oxidation of said potential primary hydroxyl group, which method comprises contacting said sugar with nitrogen tetroxide in the presence of anhydrous calcium sulfate, whereby only primary hydroxyl groups are oxidized to carboxyl groups while maintaining the lactal ring structure intact.

5. The process of oxidizing sorbose to 2-ketogulonic acid which comprises contacting sorbose with nitrogen tetroxide in the presence of a neutral inert strong dehydrating agent.

6. The process of oxidizing sorbose which comprises contacting sorbose with from 4 to 10 mols of nitrogen tetroxide per mol of sorbose in the presence of an inert strong dehydrating agent for a period of 12 to 48 hours.

7. The process for the production of ascorbic acid which comprises oxidizing sorbose by contacting said compound with nitrogen tetroxide in the presence of a neutral inert strong dehydrating agent to oxidize the primary hydroxyl group on the No. 1 carbon atom to a carboxyl group, and thereafter hydrolyzing and lactonizing the oxidation product to ascorbic acid.

8. The process according to claim 7 in which the oxidation is carried out for a period of 12 to 48 hours at approximately room temperature and in which the molar ratio of nitrogen tetroxide to sorbose is from 4 to 10 mols of nitrogen tetroxide to 1 mol of sorbose.

9. The process of oxidizing sorbose which comprises contacting sorbose with from 4 to 10 mols of nitrogen tetroxide per mol of sorbose in the presence of anhydrous calcium sulfate for a period of 12 to 48 hours.

10. The process for the production of ascorbic acid which comprises oxidizing sorbose by contacting said compound with nitrogen tetroxide in the presence of anhydrous calcium sulfate to oxidize the primary hydroxyl group on the No. 1 carbon atom to a carboxyl group, and thereafter hydrolyzing and lactonizing the oxidation product to ascorbic acid.

11. The process for the production of ascorbic acid which comprises oxidizing a compound selected from the group consisting of sorbose and the glycosides thereof by contacting said compound with nitrogen tetroxide in the molar ratio of from 4 to 10 mols of nitrogen tetroxide per mol of said compound for a period of from 12 to 48 hours at approximately room temperature in the presence of anhydrous calcium sulfate to oxidize the primary hydroxyl group on the No. 1 carbon atom to a carboxyl group, and thereafter hydrolyzing and lactonizing the oxidation product to ascorbic acid.

References Cited in the file of this patent

UNITED STATES PATENTS

| | | |
|---|---|---|
| 2,520,255 | Peterman | Aug. 29, 1950 |
| 2,520,256 | Peterman | Aug. 29, 1950 |

OTHER REFERENCES

Yackel: J. Am. Chem. Soc. 64, 121–7 (1942).
Pigman: Chem. of Carbohydrates, 1948, pp. 332–4.